Oct. 4, 1938.                C. J. SURDY                2,131,907
                         CONVEYING MECHANISM
                       Filed March 23, 1935              3 Sheets-Sheet 1
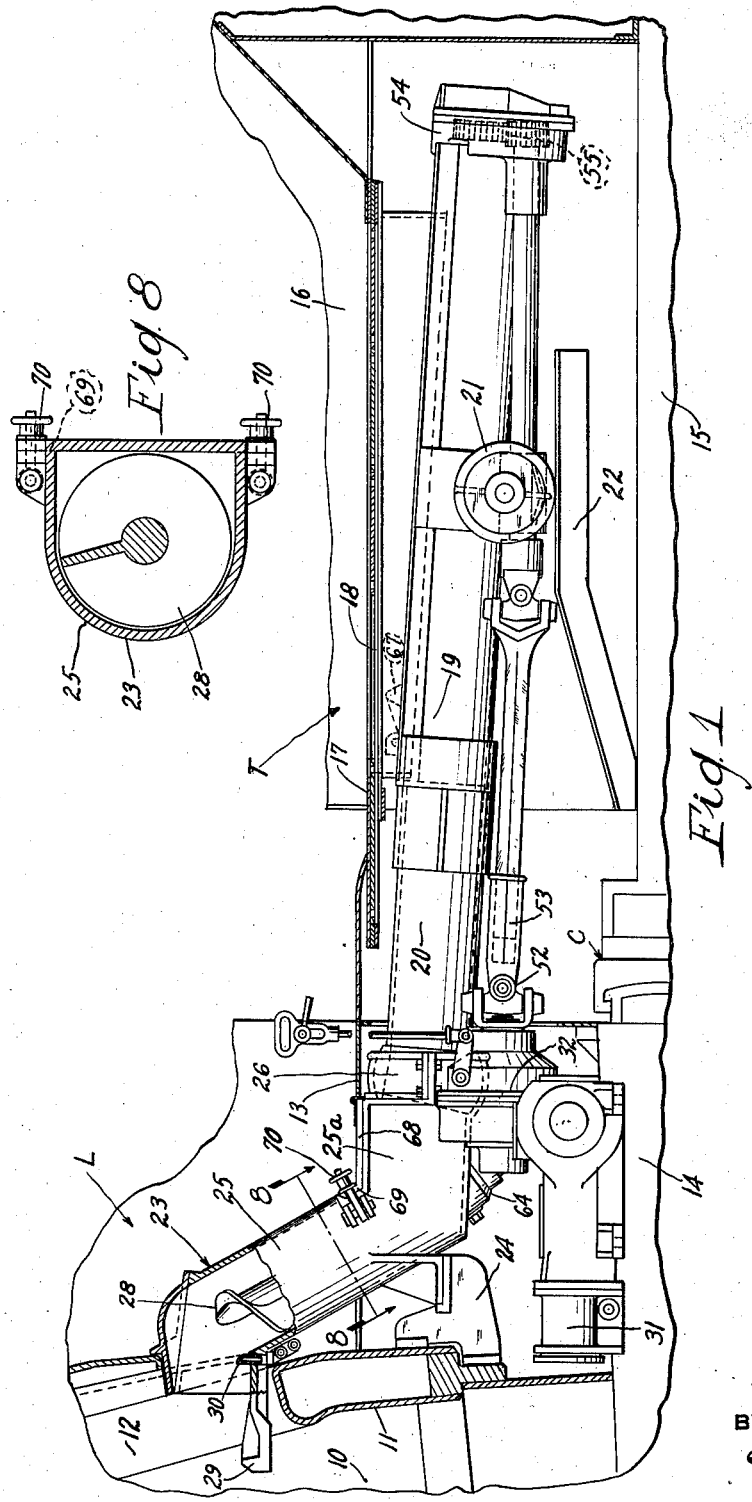
INVENTOR
Charles J. Surdy
BY
E. Archer Turner
ATTORNEY Oct. 4, 1938.     C. J. SURDY     2,131,907
CONVEYING MECHANISM
Filed March 23, 1935     3 Sheets-Sheet 3

INVENTOR
Charles J. Surdy
BY
ATTORNEY

Patented Oct. 4, 1938

2,131,907

UNITED STATES PATENT OFFICE 2,131,907

CONVEYING MECHANISM

Charles J. Surdy, Tuckahoe, N. Y., assignor, by mesne assignments, to The Standard Stoker Company, Inc., (1922), New York, N. Y., a corporation of Delaware Application March 23, 1935, Serial No. 12,583

4 Claims. (Cl. 198—15)

My invention relates to driving mechanism and especially to such mechanism for use in driving conveyors, particularly conveyors of a locomotive stoker.

The principal object of my invention resides in the provision of novel and practical driving mechanism for a conveying system employing several conveyors and the novel flexible relation of the driving mechanism with the conveying system.

More specifically the invention contemplates the provision of driving mechanism operatively and flexibly connected with one conveyor and secured with the driving mechanism of another conveyor for adjustment in any one of a number of positions.

Another object of my invention resides in the provision of novel and practical driving mechanism for a conveying system employing several conveyors, for interrupting the operation of a portion of the conveying system while continuing the operation of another portion of the conveying system.

Still another object of my invention resides in the novel construction, combination and relation of elements designed to permit relieving of clogs in a simple and expeditious manner in stokers of the type having an upturned conduit portion with a screw therein for elevating fuel and having a lateral extension at its lower end for receiving fuel.

These and other objects, such as the particular construction of the parts and their novel relation one with another, will be apparent from the following description when read in connection with the accompanying drawings, in which, Fig. 1 is a vertical medial section through adjacent portions of a locomotive and tender with a stoker embodying my invention applied thereto, parts of the stoker being shown in vertical medial section with other parts shown in side elevation;

Fig. 8 is a sectional view taken on the line 8—8 of Fig. 1.

Figure 3:
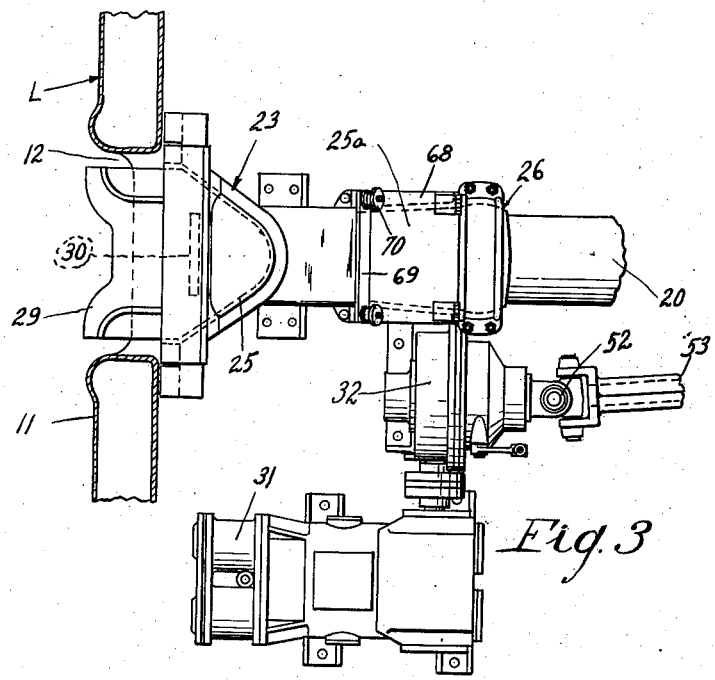
Fig. 3 is a plan view of the stoker and driving mechanism illustrated in Fig. 2, as applied to a locomotive backhead shown in section.
Figure 2:
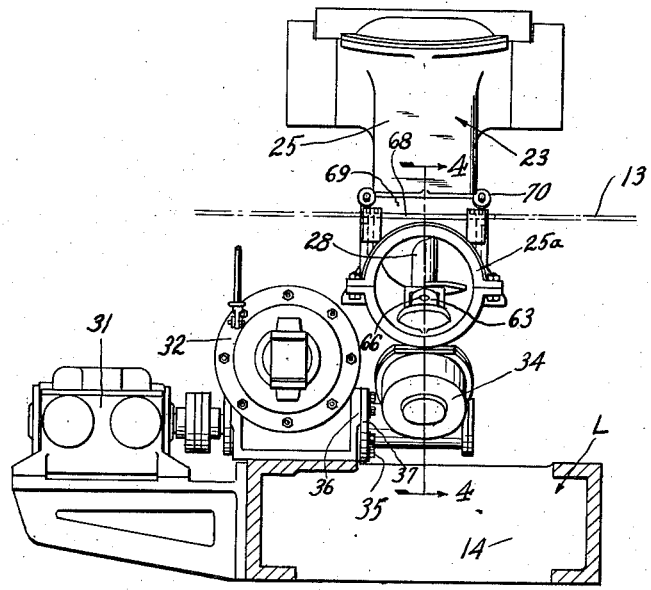
Fig. 2 is a transverse sectional view through the locomotive frame, with the parts of the stoker and driving mechanism mounted on the frame being shown in end elevation.

In the drawings, the letters L and T indicate a locomotive and tender, respectively, and conventional means for flexibly coupling them is shown at C. The locomotive is provided with a firebox 10 having a backwall 11 with a firing opening 12 therein. A cab deck 13 extends rearwardly of the backwall 11 below the lower edge of the firing opening 12 and above the locomotive frame 14. The tender is provided with a frame 15 and a fuel bin 16 having a floor 17 with an opening 18 therein.

Immediately below the opening 18 is located a fuel receiving conveyor trough 19 provided at its forward end with a tubular conduit 20 extending forwardly to the locomotive. Movement of the trough incident to the relative movements of the locomotive and tender is provided for in part by mounting the trough upon rollers 21 which rest upon track elements 22 supported from the frame 15 of the tender and extend longitudinally thereof.

A fuel delivery conduit 23 is rigidly secured to the backwall 11 by any suitable means, as by the bracket 24. This conduit comprises an inclined riser or elevating portion 25 and at its lower end is provided with a rearwardly extending hopper-like portion 25a, in which the forward end of the tubular conduit 20 is pivoted by means of the ball and socket connection 26.

Fuel is conveyed forwardly through the trough 19 and tubular conduit 20 by screw conveying means 27 and urged forwardly through the hopper-like portion 25a by the pressure of the screw conveying means 27 and elevated through the riser conduit portion 25 to the firing opening 12 by a screw conveyor 28. There the fuel is delivered onto a plate 29 from which it is projected and scattered over the fire in the firebox by means of blasts of pressure fluid issuing from a distributor head 30.

Power for operating the stoker conveyor screws 27 and 28 is provided by a motor 31 mounted on the locomotive frame 14 to one side of the conduit 23. A gear casing 32 is mounted on the locomotive frame between the motor 31 and the conduit 23 and is provided with a transverse bore 33 aligned with the crank shaft of the motor. A second gear casing 34 is supported by and rigidly secured to the casing 32 by means of bolts 35 passing through the flanges 36 and 37 of the casings 32 and 34, respectively. The casing 34 is positioned beneath the riser conduit 23 and is provided with a transverse bore 38 in axial alignment with the bore 33. The flange 37 of the casing 34 is provided with a plurality of slots 39 through which pass the bolts 35; thus by loosening the bolts 35, the casing 34 may be rotatably adjusted about the axis of the bore 33 and secured in any one of a number of positions.

A shaft 40 journalled in the soft metal bearings 41 in the bores 33 and 38 is provided with the worm 42 within the casing 32 and the worm 43 within the casing 34. In the casing 32 and meshing with the worm 42 is a gear 44 made fast on the longitudinally extending stub shaft 45 by a key 46. One end of the shaft 45 is mounted in anti-friction bearings 47 while the other end of the shaft 45 is loosely received in the hollow hub or shaft 48 which in turn is mounted for rotation in the bearing 49 but is fixed against longitudinal movement between the enlargement 80 of the shaft 45 and the collar 81. A clutch member 50 mounted on the shaft 45 is provided with a keyway 82 engaging the key 83 whereby the member 50 will rotate with the shaft 45 and move longitudinally therealong in one direction to engage the clutch teeth 51 of the hollow hub or shaft 48 and in the opposite direction to disengage the clutch teeth 51. The hollow hub or shaft 48 is universally connected, as at 52, with the telescopic shafting 53 which extends rearwardly to the gear housing 54 mounted at the rear of the trough 19. Gearing 55 in the housing 54 operatively connects the shafting 53 with the conveyor screw 27.

In the casing 34 and meshing with the worm 43 is a gear 56 made fast on the shaft 57 by a key 58. The shaft 57 and gear 56 are mounted in the casing 34 in anti-friction bearings 59. One end of the shaft 57 extends through the casing 34, the projecting portion thereof comprising the telescopic sections 60 and 61. The section 61 is polygonal in cross section and the inner surface of the section 60 is similar in shape to prevent relative rotary movement between the sections. The side faces of the section 61 are slightly curved, as shown at 62 in Fig. 4, to permit slight pivotal movement between the telescopic sections 60 and 61. A link 63 is mounted in a bearing 64 formed in the bottom wall of the conduit 23. The link 63 and the telescopic shaft section 61 are each provided with an element of a universal connection 65 and the link 63 and the screw conveyor 28 are each provided with an element of a universal connection 66.

Since the gear casing 32 is rigidly secured to the locomotive frame 14 and the gear casing 34 is rigidly secured to the casing 32, it is obvious that any deflection of the frame 14 causes deflection of the shaft 57. Also, since the conduit 23 is rigidly secured to the backhead 11, contraction and expansion of the backhead causes displacement of the conduit 23 with corresponding displacement of the screw conveyor 28. It follows that in an actual installation relative movement will occur between the screw conveyor 28 and the shaft 57 through which it is driven. This relative movement is provided for by the novel flexible driving connection between the screw conveyor 28 and the shaft 57, described above, including the telescopic sections 60 and 61 of the shaft 57, the pivotal movement between the sections 60 and 61 and the universal connections 65 and 66 between the link 63 and the shaft 57 and screw conveyor 28, respectively.

Figure 4:
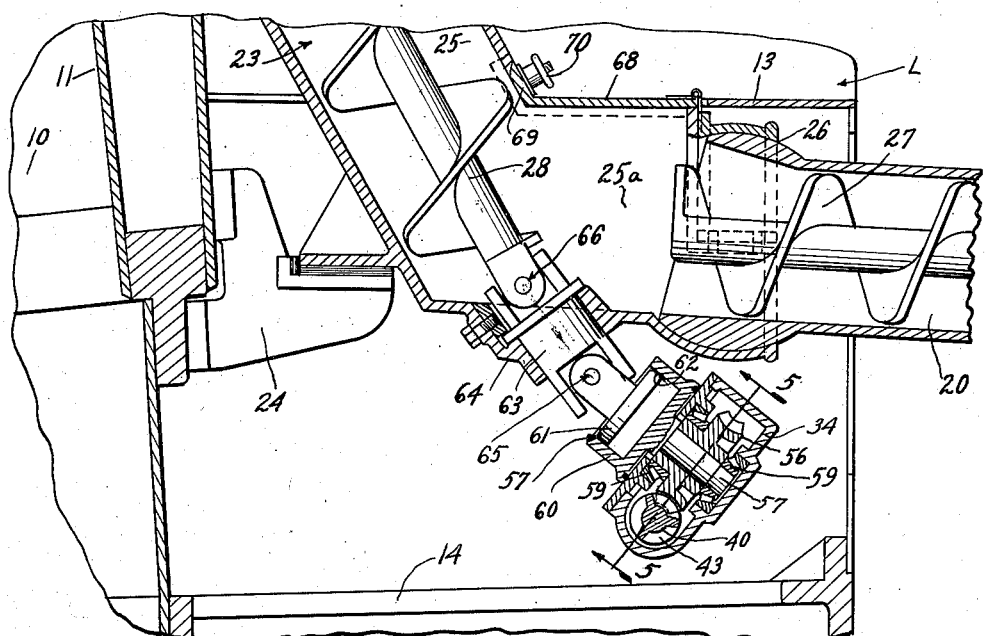
Fig. 4 is a sectional view taken on the line 4—4 of Fig. 2.
Figure 5:
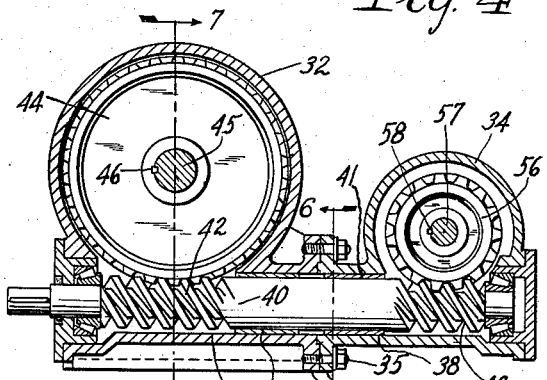
Fig. 5 is a composite sectional view on the line 5—5 of Fig. 7 and the line 5—5 of Fig. 4.
Figure 6:
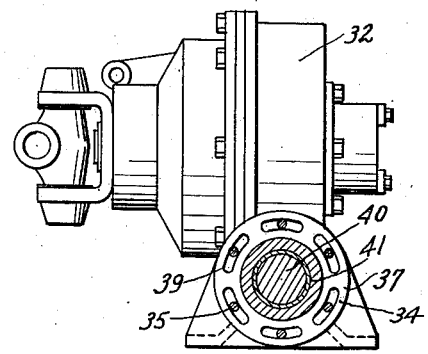
Fig. 6 is a sectional view taken on the line 6—6 of Fig. 5.
Figure 7:
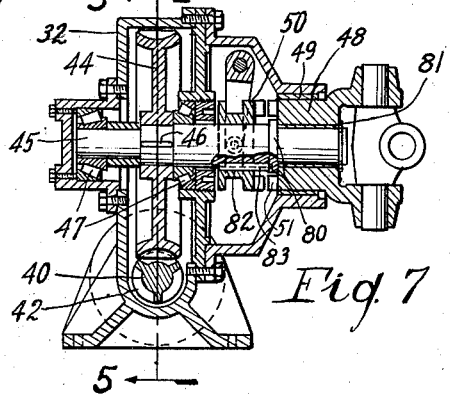
Fig. 7 is a sectional view taken on the line 7—7 of Fig. 5.

Referring particularly to Fig. 4 it will be seen that the axis of the link 63 is at a lesser angle to the horizontal than the axis of the conveyor screw 28 and the axis of the shaft 57 is at a lesser angle to the horizontal than the axis of the link 63. This is of great importance in installations on locomotives in which the distance between the base of the riser conduit and the frame is so limited that were the shaft for driving the screw in the riser conduit in axial alignment with the screw, it would bring the gear casing for the driving shaft so low that the locomotive frame would constitute an obstruction. With my novel construction and relation of parts, the axis of the driving shaft 57 is at a considerably smaller angle to the horizontal than the axis of the conveyor screw 28, thereby raising the gear casing 34 above the locomotive frame 14. By having the axes of the link 63 and the shaft 57 at successively lesser angles to the horizontal than the axis of the conveyor screw 28 and providing the universal connections 65 and 66, moderate angles at the driving connections are advantageously secured.

The novel flexible driving connection between the shaft 57 and the conveyor screw 28 together with the adjustability of the gear casing 34 is of particular advantage when installing a stoker of the type in which it is important that the riser conduit be maintained in a particular relation with the backhead or the firing opening and the screw in the riser conduit is driven from its lower end by driving mechanism rigidly secured to the frame. Depending upon the angularity of the backhead, which varies with different types of locomotives, the angularity of the riser conduit and its conveyor screw would vary in installations of the type just described. The variations in the angularity of the riser conduit may be such that the screw therein cannot be operatively connected with the rigidly mounted driving mechanism. My invention, as described above, however, provides for adjustment of the gear casing 34 rotatably about the axis of the worm shaft 40, thereby permitting the angularity of the shaft 57 to be varied to wholly or partially compensate for the variations in the angularity of the riser conduit 23 and its conveyor screw 28. The flexible driving connection between the shaft 57 and conveyor screw 28 also compensates for slight variations in the angularity of the riser conduit 23 and its conveyor screw 28.

During operation of the conveying system, extraneous matter in the fuel will sometimes lodge between the crusher 67 and the flights of the conveyor screw 27, causing the entire conveying mechanism to become inoperative. Now, by disengaging the clutch member 50 from the clutch teeth 51, the shafting 53 is rendered inoperative and, consequently, the screw conveyor 27 remains stationary while the conveyor screw 28 continues to operate. The stoker operator may then swing open the hinged cover 68 which is over the hopper-like portion 25a of the conduit 23 and manually deliver fuel therein, whereby the screw conveyor 28 will continue delivery of fuel to the distributor plate 29.

The cover 68 is provided with an inclined portion 69, which forms a portion of the rear wall of the elevating section 25 of the conduit 23 when the cover is in closed position. Locking means 70 are provided for normally securing the cover 68 in closed position. In a stoker having an upturned conduit portion with a screw therein for elevating fuel and having a lateral extension at its lower end for receiving fuel, extraneous matter will at times become lodged between the conveyor screw and the lower portion of the rear wall of the upturned conduit portion, stalling the stoker. By forming the lower portion 69 of the rear wall of the upturned conduit portion or riser 23 as part of the cover 68, the extraneous matter is easily dislodged by the simple expedient of unfastening the locking means 70.

While the invention has been described in connection with a stoker conveying system, it is apparent that its use is not limited to such devices but is applicable in a variety of conveying systems.

I claim:

1. In a locomotive provided with a frame and a firebox having a backwall with a firing opening therein, an upwardly extending stoker conduit delivering to said firing opening, a conveyor screw in said conduit, a motor for operating said conveyor screw, said motor being rigidly secured to said frame, a shaft operatively connected with said motor disposed subjacent the conveyor screw in said upwardly extending conduit, gearing operatively connected with said shaft and being disposed subjacent the conveyor screw in said upwardly extending conduit, and a link journaled in said upwardly extending conduit at one end universally connected with said conveyor screw and at its other end universally connected with said gearing, said shaft, link and conveyor screw being at successively greater angles to the horizontal.

2. In a locomotive provided with a frame and a firebox having a backwall with a firing opening therein, an upwardly extending stoker conduit delivering to said firing opening, a conveyor screw in said conduit, a motor for operating said conveyor screw, gearing on the locomotive above said frame and below said upwardly extending conduit operatively connected with said motor, a telescopic shaft operatively connected with said gearing, and a link journaled in said upwardly extending conduit at one end universally connected with said conveyor screw and at its other end universally connected with said telescopic shaft, said shaft, link and conveyor screw being at successively greater angles to the horizontal.

3. In a locomotive provided with a frame and a firebox having a backwall with a firing opening therein, an upwardly extending stoker conduit delivering to said firing opening, a conveyor screw in said conduit, a bearing in the bottom wall of said conduit, a motor for operating said conveyor screw mounted on the locomotive frame, a shaft operatively connected with said motor and extending transversely of the locomotive, gearing operatively connected with said shaft, a telescopic shaft operatively connected with said gearing and a link mounted in said bearing at one end universally connected with said conveyor screw within the upwardly extending conduit and at its other end universally connected with said telescopic shaft without the upwardly extending conduit, said telescopic shaft, link and conveyor screw being at successively greater angles to the horizontal.

4. In a locomotive provided with a frame, and a firebox having a backwall with a firing opening therein, a conduit supported on said backwall including an elevating portion and a rearwardly extending portion at the lower end of said elevating portion, a conveyor screw in said elevating portion disposed at an angle more nearly vertical than horizontal, gearing disposed above and supported on said frame for operating said conveyor screw, a motor operatively connected to said gearing, a shaft driven by said gearing and having its axis disposed in the space included between the bottom of the rearward extending portion of said conduit and the transverse plane passing through the axis of said conveyor screw, and means telescopically and flexibly connecting said shaft and said conveyor screw.

CHARLES J. SURDY.